July 4, 1933.  G. LANDER  1,916,842
CREAM SEPARATOR FOR MILK BOTTLES
Filed April 7, 1932
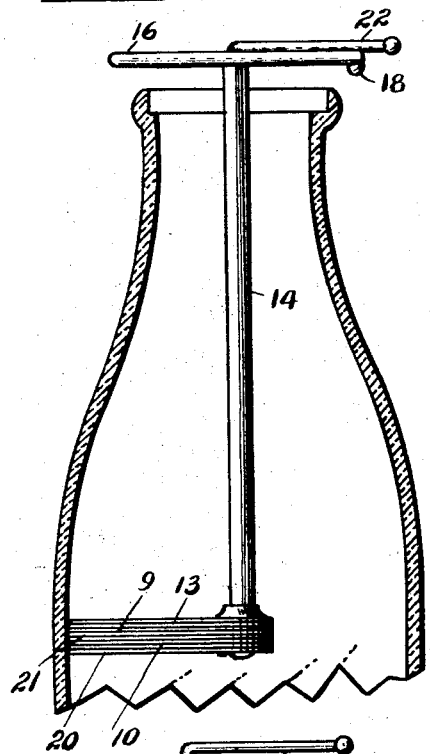
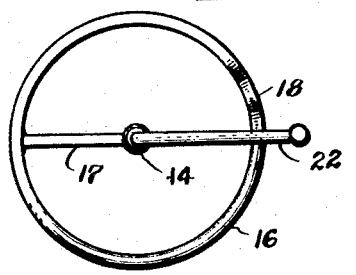
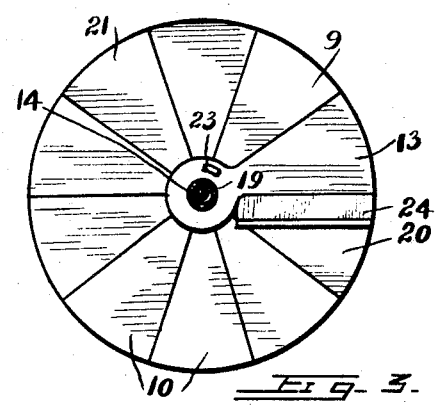
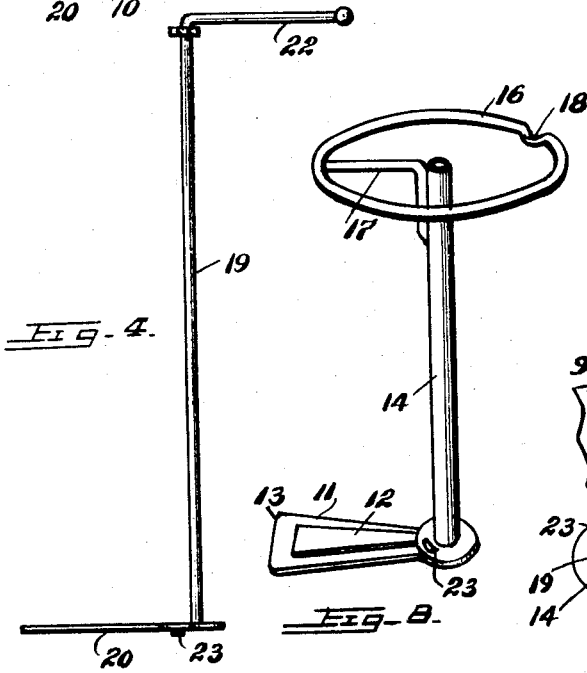
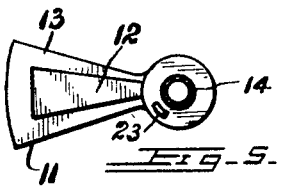
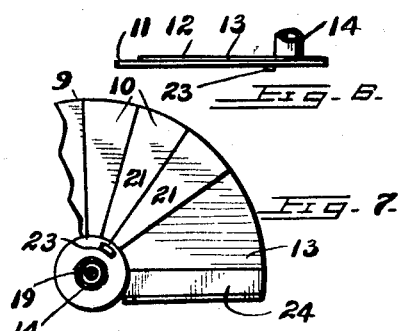
Inventor
Gerald Lander
By Frederick E. Bromley
Attorney.

Patented July 4, 1933

1,916,842

UNITED STATES PATENT OFFICE

GERALD LANDER, OF VINELAND, ONTARIO, CANADA

CREAM SEPARATOR FOR MILK BOTTLES

Application filed April 7, 1932. Serial No. 603,768.

The invention is a device for insertion in a bottle of milk in order to enable the cream to be poured off so as to separate it from the milk.

By the aid of this device cream can be easily poured off for use separately from the milk.

The device is inexpensive to manufacture and can be readily inserted and removed from a milk bottle.

The invention consists essentially of a head that opens like a fan to separate the milk from the cream. The head is attached to a stem that extends out of the bottle and carries a quadrant and lever by which the head is opened and closed.

Referring to the accompanying drawing, Figure 1 is a sectional view of the top half of an ordinary milk bottle depicting the invention inserted in it. The device is shown in its closed position.

Figure 2 is a plan view of the top of the device.

Figure 3 is a plan view of the head spread out to seal off the cream from the milk.

Figure 4 is a detail view illustrating the lever joined by a rod to the extreme lower blade of the head.

Figure 5 is a detail plan view of the upper fixed blade of the head.

Figure 6 is a side elevation thereof.

Figure 7 is a fragmentary plan view of the head partly open and showing an end piece for the head.

Figure 8 is a perspective view of the quadrant connected to the fixed upper blade by a hollow stem.

Like numerals of reference indicate corresponding parts in each of the figures throughout the drawing of the invention.

In the drawing, the reference numeral 9 generally denotes the head which comprises a plurality of radial blades 10, each of which is a sector of a circle. The blades are constructed of suitable material, and it is suggested that the top one only or all of the blades be suitably reinforced; in which case the blades could be made of rubber as at 11, reinforced by spring steel members as at 12— see Figures 5 and 8. Such a construction, however, is arbitrary since the reinforcing of the blades of this nature is already known in the art. The blades compose a circle when opened out in overlapping relation so as to close off the milk bottle at the cream line.

The top blade 13 is fixed to a hollow stem 14 of a length sufficient to project from the mouth of the bottle. The upper end of the stem has a quadrant 16 fixed to it. The quadrant consists of a ring joined by a rigid arm 17 to the stem. The ring is bent to form a depression 18.

Within the hollow stem is a rod 19 the lower end of which is fixed to the bottom blade 20, which together with the intermediate blades 21 and top blade 13 constitutes the head. The upper end of the rod carries the lever 22 which is integral with or secured thereto. The lever swings around the quadrant to open and close the blades of the head. As the blades are fully opened the lever clicks with the depression which retains it in its open position.

Each blade has an indent 23. The indent of one blade fits into the indent of the adjoining blade in order to position the blades.

It is proposed to provide a check member 24 for sealing the gap between the meeting top and bottom blades of the head when the head is opened. This check member may be constructed of suitable material and may be attached to the top blade as depicted in Figure 7.

To use the device it is inserted in a bottle of milk as depicted in Figure 1. The head is positioned at the cream line and opened by manually turning the lever which spreads the blades to the circular shape illustrated in Figure 3. The lever is held by the depression 18 in the quadrant; the cream is poured off, then the device is closed and removed from the bottle.

What I claim is:—

A cream separator for a milk bottle comprising a head composed of radial blades arranged one on top of another, a hollow stem fixed to the top blade, a rod running therethrough and fixed to the bottom blade, a quadrant secured to the top of the stem, a depression therein, a lever rigid with the upper end of the rod for turning around said quadrant and engaging in said depression.

Signed at Beamsville, Ontario, Canada, this twelfth day of March 1932.

GERALD LANDER.